United States Patent [19]

Kreitzberg

[11] 4,093,051

[45] June 6, 1978

[54] HYDRAULIC CONTROL SYSTEM FOR POWER SHIFT TRANSMISSION

[75] Inventor: Ernest A. Kreitzberg, Mukwonago, Wis.

[73] Assignee: Allis-Chalmers Corporation, Milwaukee, Wis.

[21] Appl. No.: 710,908

[22] Filed: Aug. 2, 1976

[51] Int. Cl.² ............................................. B60K 29/02
[52] U.S. Cl. ............................. 192/87.13; 192/87.19; 192/109 F; 192/4 A; 74/364
[58] Field of Search ............. 192/109 F, 87.13, 87.18, 192/87.19, 3.57

[56] References Cited

U.S. PATENT DOCUMENTS

| | | | |
|---|---|---|---|
| 3,469,472 | 9/1969 | Bislew | 192/109 F |
| 3,543,891 | 12/1970 | Mathers | 192/4 C |
| 3,583,422 | 6/1971 | Dach | 192/109 F |
| 3,850,273 | 11/1974 | Murakami | 192/109 F |
| 3,998,111 | 12/1976 | Blake | 192/4 A |

Primary Examiner—Benjamin W. Wyche
Attorney, Agent, or Firm—Arthur L. Nelson

[57] ABSTRACT

A hydraulic control system including a plurality of individual clutch valves for selective operation for controlling clutches in a power shift transmission. A modulating valve and a clutch valve release mechanism are included for modulating the clutch engaging pressure and the clutch disengaging pressure automatically. A single source of pressurized fluid provides pressurized fluid for operating the hydraulic actuators through the clutch valves and pressurized fluid to lubricate the power shift transmission having wet clutches which operate in hydraulic fluid.

10 Claims, 2 Drawing Figures

HYDRAULIC CONTROL SYSTEM FOR POWER SHIFT TRANSMISSION

This invention relates to a power shift transmission, and more particularly to a hydraulic control systems for operating the power shift transmission including a control rack operating individual clutch valves connected to hydraulic actuators for each of the clutches and a modulating valve for modulating fluid pressure when actuating and deactivating the hydraulic clutches during operation of the power shift transmission.

Conventional tractors are provided with a manually shifted gear transmission in which the gear ratio the tractor will be operating is selected while the tractor is stationary. The tractor is then driven in this gear ratio until the tractor is stopped and the transmission is selectively shifted to any other desirable gear ratio to accommodate any change in traction or change in load or the tractor. An improvement over this type of operaton is the provision of a power shift transmission with a high-low range which drives throught the mechanical main transmission. This type of a transmission provides a high-low range in any selected speed ratios of the main transmission. It accommodates for an increase in torque or speed as required by the tractor during its normal operation. This type of a tractor is an improvement over conventional tractors. There is a further advantage in having the capability of full-range, "on-the-go" power shifting to provide greater flexibility in matching engine power to the load requirements. This provides smooth load transfer during shifting with greater versatility of the tractor for adapting it to almost any type of load conditions.

Accordingly, this invention provides for a power shift transmission for controlling the actuation of clutches, modulaton of pressure, manually feathering of fluid and lubrication of six hydraulic disc-type wet clutches used in the power shift transmission. Individual clutch valves are actuated by a single control rack moving in a channel on top of the clutch valve body. Two cammed tracks of inclined ram segments positioned along the bottom of the control rack provided the timing and sequencing mechanism for the spools of the clutch valves.

The control system includes a hydraulic pump with a pressure regulator supplying pressurized fluid to the clutch pack while excess flow is fed through he control valve to an oil cooler located in the system. A lube pressure circuit is also provided in the system with a pressure relief valve which channels lube flow directly to sump, sould the lube pressure become excessive such as during cold-weather starts. A pressure transducer is also positioned in the rear transmission lubrication line to alert the operator of transmission damage if the lubrication pressure should drop below a minimum value.

The modulating valve includes two spools separated by a spring working in conjunction with several orifices to provide means for controlling the rate of pressure rise for engaging a clutch. An inching valve is also provided in the system and at least one of a preselected two of the clutch valves is engaged in all of the transmission ratios. Since two clutches must be pressurized in order to obtain output driving torque, it is relatively simple to place an operator controlled inching valve in the clutch applicaton line between the modulator valve and tow of the clutch valves to provide inching control. The control system is adapted for use with a power shift transmission as illustrated in U.S. Pat. No. 3,929,037 of James E. Marsch.

Accordingly, it is an object of this invention to provide a hydraulic control system for a power shift transmission to provide the timing, actuation, modulation, and for lubricaton of the transmission and the wet-disc clutches in the transmission.

It is another object of this invention to provide a hydraulic control system having a modulator valve to modulate the pressurized fluid flowing through the clutch valves to the hydraulic clutch actuators.

It is a further object of this invention to provide a hydraulic control system for a multiple-speed power shift transmission having a spring biased clutch valve operating against a dashpot means in the clutch valve to control the timing of the clutch release of each clutch when the transmission is shifted.

It is a further object of this invention to provide a hydraulic control system in a multiple-speed power shift transmission having a modulator valve and an inching valve controlling the rate of fluid flow from the source of pressurized fluid through the selected clutch valve and to the hydraulic actuator for operating the selected clutches for the desired gear ratio of the transmission.

Objects of this invention are accomplished by providing a plurality of spool valves operating as clutch valves to selectively actuate mating clutches in a power shift transmission. A source of pressurized fluid is connected through a modulator valve for modulating of pressure applied to each of the plurality of clutch valves. Connected in series with the modulator valve for operation through at least two clutch valves is an inching valve providing manual control for modulating the pressurized fluids supplied to at least two of the clutch valves in the power shift transmission. At least one of these two clutch valves controlled through the inching valve will always be engaged during any speed ratio of the power shift transmission. Accordingly, there is manual control of the inching valve in every speed ratio of the transmission to provide manually controlled fluid modulation to the transmission in any speed ratio, as well as automatic modulation of perssurized fluid supplied to the clutches in any speed ratio in the power shift transmission through the modulator valve. In communicaton with the pump is connected a lubricating circuit which supplies pressurized fluid at a lower pressure for supplying fluid for lubrication to the transmission for wet-clutch operaion of the clutches in the power shift transmission at all times. This circuit also provides lubrication of the bearings and other related moving components of the transmission.

The preferred embodiment of this invention is illustrated in the attached drawings.

Figure 1:
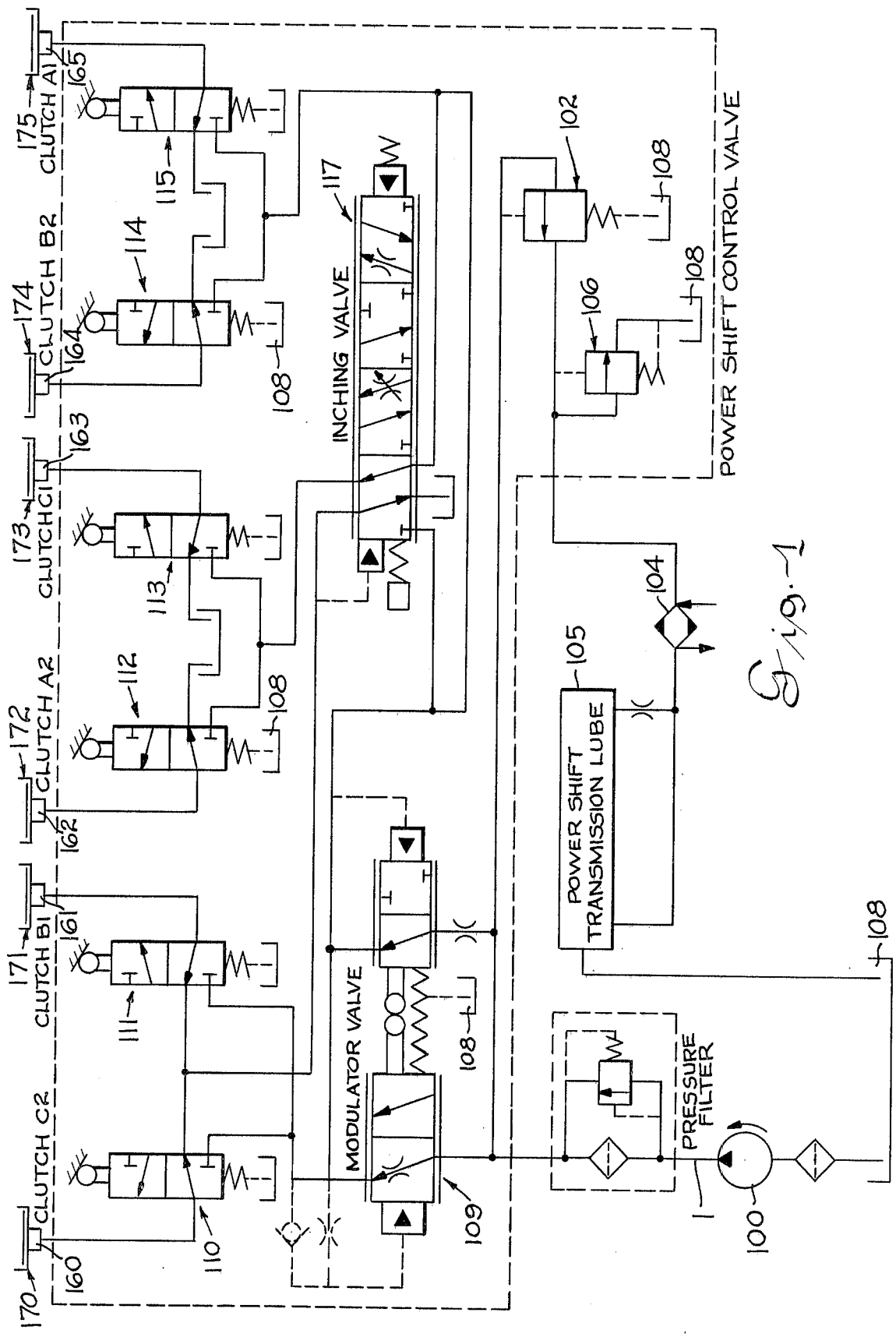
FIG. 1 illustrates a schematic drawing of the hydraulic control system for the power shift transmission.
Figure 2:
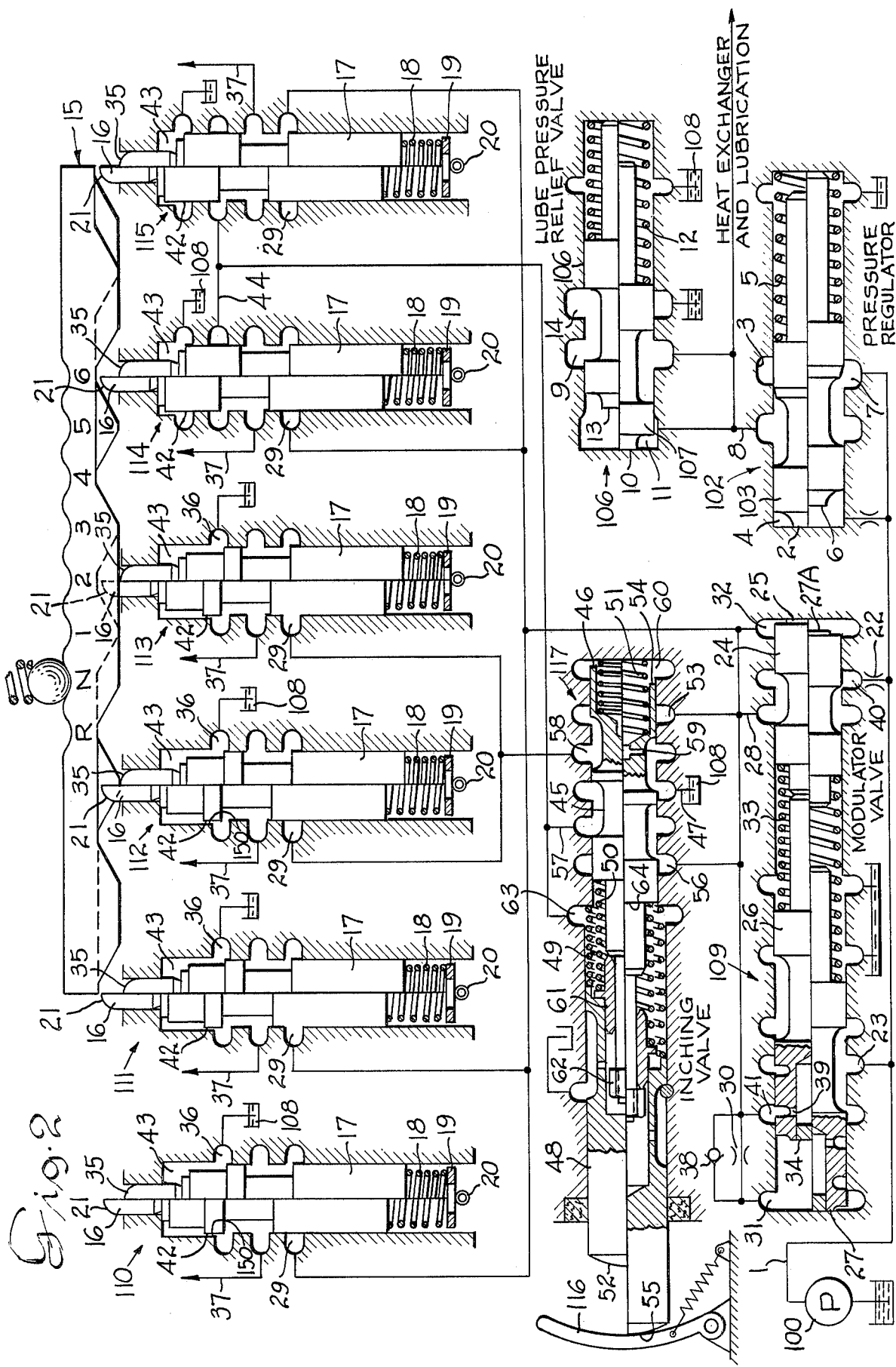
FIG. 2 illustrates a partially cross-sectioned diagram of a hydraulic system for the power shift transmission.

The hydraulic system schematically illustrated in FIG. 1 shows the same system partially drawn in section as shown in FIG. 2. FIG. 2 shows normally the tow positions of the valves on opposing sides of the center line of each of the valves. The main functions of the control system are to provide lubrication flow for the transmission gear box components, namely clutch discs, bearings, gears and so on, and also to provide the timing and rate of pressure build-up when shifting from one range to another.

The power shift transmission is continuously lubricated during the vehicle operating cycle. Normally, an engine driven hydraulic pump supplies hydraulic fluid flow varying in quantity determined by the vehicle engine speed; although, any suitable drive for the hydraulic pump may be used in operating the pump. The inlet flow from the pump 100 flows through the conduit 1. The flow of hydraulic fluid flows through the pressure regulator 102, which is initially as shown in the position 2. Pressurized fluid stands by in the conduit 1 and the annular recess 3 while the inner pressure builds up to system pressure. Pilot pressure also building up in the pressurizing chamber 4 creates a force againt the spool 103 to overcome the opposing force of spring 5 and pushes the spool 103 toward a position 6. The port 7 allows the inlet flow of hydraulic fluid to flow past the pressure regulator valve 102 and out the conduit 8 to the heat exchanger 104 and to the power shift transmission lubrication circuit 105. The opposing forces will pressurize fluid in the pressurized fluid chamber 4 and spring 5 will balance one another and thereby maintain system pressure at a predetermined value of approximately 190 pounds per square inch.

Fluid flow from the pressure regulator 102 is standing by the inlet port 9 of the lubrication pressure relief valve 106, which is initially in the position 10. Pilot pressure from the same source of pressurized fluid, pump 100, exerts a force in the pressurizing chamber 11 against the lubrication pressure relief valve spool 107 opposing the force of the relief valve spring 12. The spring force is such that under normal conditions the relief valve 106 remains closed. However, should extreme cold weather conditions or blockage of the lubrication or heat-exchanger passages cause the fluid pressure at the port 9 and consequently the force in the pressurizing chamber 11 to rise above the opposing force of spring 12, then the lubricating pressure relief valve spool 107 will move toward the position shown at 13. This will expose the inlet opening port 9 to the transmission sump cavity recess 14 which is connected to the sump 108, thus preventing extreme pressure build-up in the lubrication system and safeguarding against damage to components in the transmission.

The hydraulic control system also provides timing and proper pressure build-up rate when shifting which is accomplished by the modulator valve 109 sensing pressure changes caused by the opening or closing of the clutch valves 100, 111, 112, 113, 114 and 115. Clutch valves are connected to hydraulic actuators 160, 161, 162, 163, 164 and 165 in clutches 170, 171, 172, 173, 174 and 175, respectively. A mechanical means such as a control rack 15 is used to activate each clutch valve in the proper sequence. The control rack can be adapted for use with other transmissions using a different number of gear ratios and clutches. Inclined ramps on the control rack push against the actuator pin 16 and, in turn, move the clutch spool 17 toward the "on" position 35 depressing it against the force of the clutch valve spring 18. A washer 19 and roll pin 20 retain the entire clutch valve assembly in its respective bore when the clutch rack is moved to the deactivated position. The clutch spring 18 returns the clutch spool to its original "off" position 21.

Pump inlet fluid in conduit 1 is flowing into the control system to stand by in the pressure regulator annulus 3 and builds up pressure. Inlet fluid must fill up the control circuits before it can build up pressure to the system pressure value. Inlet fluid flows into the modulator valve 109 at the conduit ports 40 and 23. The modulator spool 24 is in the position 25 and 27A while the modulator plunger 26 is in the position 27 initially. Inlet fluid then flows past the modulator spool 24 into the passage 28 which leads to each clutch valve. With the rack in the position where all clutch spools are deactivated, the inlet flow stands by at each clutch spool 17 and builds up pressure as the pressue builds up at the pressure regulator and the pressurizing chamber 4. As the inlet pressure builds up in the system, the passage 28 carries the inlet fluid past a control passage 29 and also through orifice 30 against the end of the modulator plunger 26 at port 31. Inlet fluid also acts against the back of the modulator spool 24 at the pressurizing chamber 32. As the inlet fluid increases in pressure, forces are created against the modulator plunger 26 to oppose the force at modulator spring 33. Similarly, a force in the pressurizing chamber 32 is created againt the modulator spool 24, also opposing the modulator spring force 33. As the forces increase, the two spools move against each other. The entire assembly is later shifted toward position 25 due to the larger diameter of the modulator plunger 26. The fluid pressure in passage 28 continues to build up until it reaches full system pressure. This condition now reached constitutes the system steady state condition.

When shifting the control rack 15 from one speed range to another, any combination of clutch spools can change positions from fully "on" position 35 to the fully "off" position 21, or vice versa. To best explain the system responses during a range shift, only one clutch spool will be considered. This explanation will apply to any spool, either being activated or being deactivated.

As the control rack 15 pushes the actuator pins 16 and the clutch spool 17 to the fully "on" position 35, the sump port 36 is firt closed thereby sealing the connection between the clutch application line 37 and the sump port 36; and, as the clutch spool moves further, full system pressure that was applied to the clutch port 29 is allowed to enter the clutch valve and the clutch applicaion line 37. This sudden opening of the clutch valves 17 at the port 29 reduces the line fluid pressure in the passage 28. With this lower-than-system pressure in the passage 28, the force against the end of the modulator spool 24 and the modulator plunger 26 is reduced allowing them to move back almost to the original positions 25 and 27. This sudden movement of modulator plunger 26 is aided by the presence of a check valve 38 enabling the bypass through orifice 30 of outgoing fluid in one direction only. When the modulator plunger senses the lower pressure at 31, it moves backward because of the force of the modulator spring 33. Upon its initial movement backward, the modulator plunger feed orifice 39 is closed thereby stopping the sudden rebuilding of pressure from the inlet source that is available at 23. During this time interval, the transmission clutch pack is being filled with hydraulic fluid by virtue of opening the clutch valve 17. Fluid is supplied through orifice 22 and the opening at 40 of modulator spool 24. The opening at 40 is determined by the balance of the force of the modulator spring 33 on one end, and the hydraulic force on the other end of the modulator spool 24 of that instance. When the modulator plunger 26 reaches the end of its backward movement, a direct connection is open between the source passage 23 and the port 41 leading to the passage 28 and, thus, to the clutch application line 37. At this instance, and when the transmission clutch pack is completely filled, the pressure process reverses.

Pressure behind the modulator plunger 26 in te pressurizing chamber 31 rises at a slow rate as it is being fed only through orifice 30 since the increased pressure in the passage 28 has closed the check valve 38. Rising pressure induces the modulator plunger 26 to move back in the opposite direction, thereby increasing the force of spring 33 on the modulator spool 24 and, thus, moves this spool in the same directon until, again, positions 25 and 34, which show the system steady state condition, is reached. The slow rate of pressure rise in the system accounts for a smooth engagement of clutch that is being supplied with fluid.

The sequence of events happening when the control rack 15 moves a clutch spool 17 from the activated or "on" position 35 to the deactivated o "off" position 21 is similar to that mentioned above with the exception that the events taking place at the clutch valve are reversed. Deactivating the clutch spool allows the clutch valve spring 18 to push the clutch spool 17 and activator pin 16 back to their originial position. The clutch spool 17 closes the clutch applicaton pressure source 29 first. Then as it continues to move upward, the clutch spool 17 opens the clutch application line 37 to the sump port 36. This releases fluid from the transmission clutch pack. The clearance between the land 42 on the clutch spool 17 and the bore 150 and the space forming the dampening chamber 43 above the spool dampens the movement of latter part of the upward movement of the spool 17. This retards the spool movement and delays the release of fluid from the clutch pack being deactivated and accounts for a less abrupt disengagement of clutch discs and thus aids in obtaining a smooth shift.

The working of clutch valves 114 and 115, although physically different, is essentially the same as described above. The only difference is that upon deactivaton, the fluid is vacated from the clutch applicaiton line 37 into the passage 44 to the inching valve spool 45 which is in a position 46, and the fluid discharges to sump 108. These clutch valves 114 and 115 have a dual function which will be explained in the following section.

The inching valve allows for the precise operator control for short movement forward or backward of the vehicle by the manual control of the fluid pressure to clutch valves 113 and 112. The internal construction of the power shift transmissin is such that only the supply to these two clutch valves is controlled when inching the vehicle. An additional feature incorporated in the inching valve is that this manually operated valve during the latter part of it movement supplies fluid to activate clutch valves 114 and 115. These clutches, when activated, simultaneously act as brakes for rotating members of the power shift transmission. Accordingly, the clutch valves 114 and 115 are considered clutch-brake valves.

The inching valve 117 is comprised primarily of two spools, the inching spool 45 and the inching plunger 48. Under normal operating conditions, these two spools are manually held inward in positions 46 and 52. Fluid pressue from passage 28 is allowed to pass unrestricted through the port 53 and opening 58 past the spool 45 to the supply passages 29 of the clutch valves 112 ad 113. When the operator manual control 116 is gradually released on the inching plunger 48, the inching plunger 48 moves outward due to the force of the outer spring 49. The inching spool 45 also moves outward due to the force of the return spring 51 and the force created by the fluid pressure in the passage 29 passing through a small opening at 59 into space 60 and acts on the end of the spool 45. This outward movement is restrained by the opposing force of the inner spring 50. During this initial outward movement of the spool 45, the opening 58 is being reduced, thereby restricting flow of the fluid from the passage 53 passing the spool 45 and supplying passage 29 at clutch valves 113 and 112. As a result, the fluid pressure in passages 29 and also in space 60 is reduced. The value of fluid pressure in passages 29 depends on the position of plunger 48 since this determines the force balance acting on inching spool 45 thereby cntrolling opening 58. Sufficient movement outward of plunger 48 closes opening 58 completely and reduces the pressure to zero in clutch supply passages 29 at clutch valves 113 and 112.

When inching plunger 48 nears the end of its outward movement 55, the sleeve 61 retaining the inner spring 50 will abut against the nut 62 on the stem of the spool 45. The force of the inner spring 50 is now self-contained and no longer acting on the spool 45. The force of the return spring 51 now moves the spool 45 further outward to position 54, where it opens to fluid pressure at port 56. This fluid flows past spool 45 and into the passage 57 to the passage 44 at the clutch-brake valves 114 and 115. When these valves are in the deactivated or "off" positon 21, the fluid flows through the valves into the clutch supply passage 37 and engages the corresponding clutch pack which brake the rotating components of the transmission; hence, the dual function of the clutch-brake valves 114 and 115. At the time that the fluid is allowed to flow into the passages 57 and 44, it also enters port 63 and the valve bore creating a counteracting force on the spool 45 at 64 opposing the outward forces of the inching spool 45. Thus, this brake pressure can be controlled at a lower value to allow for a gentle braking actuation. Manual returning of the inching plunger 48 and the inching spool 45 to its initial full "in" position 46 and 52 allows the brake applying pressure to be relieved again from the passage 57 through the inching spool 45 and into the sump passage 47. At this same time, the full system clutch applicaton pressure is restored to the clutch valves 113 and 112 at 29 by the reduction and the restriction at the opening 58. As a result, the normal steady state condition of this system is once again reached in the hydraulic control system.

Accordingly, the hydraulic control system provides for manual operation of the control rack 15 which selectively engages and disengages a mating clutch for each of the clutch valves. Any specific gear ratio requires only two clutch packs for engagement in driving in the selected gear ratio. Only a single swap is required to change gear ratio. In other words, when a gear ratio is changed in the power shift transmission, only one of the clutch packs is disengaged while another clutch pack is engaged. This operaton is controlled by the control rack as it is moved axially and while one of the valve stems is selectively released or while another is depressed. The rate of return by the spool is controlled by the spring 18 and the dampening effect of the fluid escaping from the dashpot chamber 43 through the clearance between the spool 17 and the bore 150. As the fluid escapes,, the spool is retarded in its movement upwardly to its normal return position. Opening of clutch valves 113 and 115 engages the reverse gear ratio of the transmission. Engagement of the forward gear ratios is accomplished as follows: The first gear ratio by opening valves 113 and 114, the second gear ratio by valves 112 and 114, the third gear ratio by valves 112 and 113, the fourth gear ratio by valves 111 and 113, the fifth gear ratio by valves 110 and 112, and the sixth gear ratio by valves 110 and 113.

Upon actuation of each of the spool valves, fluid pressure is controlled through the modulator valve as it is applied to the clutch pack of the actuated clutch valve. The inching valve is a manual means for modulating fluid pressure in the clutch pack as the clutch is applied. Accordingly, as one clutch is released, another clutch is engaged and at some point when the pressure of the pressurized fluid in the clutch beng released becomes lower than the presure of the pressurized fluid in the clutch pack being engaged, then the shift of power is transferred from the one clutch to the other and the hydraulically operated power shift transmission is shifted to the other gear ratio.

The embodiments of the invention in which an exclusive property or privilege is claimed are defined as follows:

1. A hydraulic system for a power shift transmission comprising, a source of pressurized fluid, a plurality of hydraulic actuators for actuating clutches in said power shift transmission, a pressure modulating valve connected to said source of pressurized fluid, conduit means connecting said modulating valve to each of said hydraulic actuators, a clutch valve connected between each of said hydraulic actuators and said modulator valve for selectively operating a mating of said hydraulic actuators, an inching valve connected to said source of pressurized fluid, means connecting said inching valve to at least two of said clutch valves for modulating pressure applied to said hydraulic actuators, means for selectively and alternatively operating and releasing each of said clutch valves, resilient means in each of said clutch valves for returning said clutch valve to its return position, fluid throttling means in each of said clutch valves for regulating the rate of return of each of said clutch valves to its return position for controlling fluid flow from its mating hydraulic actuator and controlling the rate of pressure decay of pressurized fluid in the mating hydraulic actuator of the disengaged clutch, said modulating valve including a flow control valve with a piston for modulating the flow through the modulating valve to the actuated clutch valve, a pressure accumulator in said modulating valve having a plunger and resilient means between said piston and plunger operating said flow control valve in response to pressure build-up in said accumulator thereby throttling fluid flowing through said modulating valve and controlling the rate of pressure rise in said actuated clutch valve and mating hydraulic actuator of the engaged clutch.

2. A hydraulic control system for a power shift transmission set forth in claim 1 wherein said plunger in said modulating valve defines an accumulator chamber, a discharge valve connected between said accumulator chamber and said conduit means connecting said modulating valve and each of said clutch valves for discharge of fluid into said conduit means during initial operation of said accumulator.

3. A hydraulic control system for a power shift transmission as set forth in claim 1 including means serially connecting said modulating valve with said inching valve.

4. A hydraulic control system for a power shift transmission as set forth in claim 1 wherein said plunger in said modulating valve defines an accumulator chamber for accumulating pressurized fluid, an orifice connected between said accumulator chamber and said conduit means, a check valve connected between said accumulator chamber and said conduit means permitting fluid flow from said accumulator chamber to said conduit means.

5. A hydraulic control system for a power shift transmission as set forth in claim 1 wherein each of said clutch valves includes means for operating said clutch valve, means defining a dashpot chamber on one end of said clutch valve, means defining restrictive passage means restricting the rate of flow from said dashpot chamber for controlling the rate of discharge of fluid from the mating hydraulic actuator when its mating clutch is disengaged.

6. A hydraulic control system for a power shift transmission as set forth in claim 1 wherein each of said clutch valves defines a dashpot with restricted passage means leading from said dashpot to control the rate of return of said clutch valve when said clutch valve is closed.

7. A hydraulic control system for a power shift transmission as set forth in claim 1 wherein said inching valve defines a manually operated inching spool, and inching flow control spool controlling the rate of throttling across said inching valve to engage a mating clutch of said clutch valve.

8. A hydraulic control system for a power shift transmission as set forth in claim 1 wherein said inching valve includes two spools, means resiliently biasing said spools in spaced relation to each other, manual operating means operating a first of said spools, resilient means operating said second spool, said second of said spools including lands for controlling the rate of fluid flow to at least one of said clutch valves when said inching valve is operated.

9. A hydraulic control system for a power shift transmission as set forth in claim 1 including a lubricating circuit connected to said source of pressurized fluid, a pressure regulating valve regulating the flow of fluid to said lubricating circuit for lubrication of clutch discs and components in said power shift transmission.

10. A hydraulic control system for a power shift transmission as set forth in claim 1, a lubrication circuit connected to said source of pressurized fluid, a pressure regulator valve for regulating the pressure of hydraulic fluid in said lubricating circuit, a pressure release valve in said lubricating circuit for limiting excessive pressures in said lubrication circuit.

* * * * *